US006268667B1

(12) United States Patent
Denne

(10) Patent No.: US 6,268,667 B1
(45) Date of Patent: Jul. 31, 2001

(54) APPARATUS FOR PRODUCING LINEAR MOTION

(75) Inventor: Phillip Raymond Michael Denne, Bournemouth (GB)

(73) Assignee: Advanced Motion Technologies, LLC, Aston, MD (US)

( * ) Notice: Subject to any disclaimer, the term of this patent is extended or adjusted under 35 U.S.C. 154(b) by 0 days.

(21) Appl. No.: 09/379,063

(22) Filed: Aug. 23, 1999

Related U.S. Application Data

(63) Continuation of application No. PCT/GB98/00495, filed on Feb. 20, 1998.

(51) Int. Cl.[7] ................................................. H02K 41/00
(52) U.S. Cl. ............................. 310/12; 310/13; 310/14; 310/156; 310/89; 310/91
(58) Field of Search ................................ 310/12, 13, 14, 310/156, 89, 91

(56) References Cited

U.S. PATENT DOCUMENTS

| 3,881,139 | * | 4/1975 | Inaba et al. ............................. 318/38 |
| 4,217,507 | | 8/1980 | Jaffe et al. ............................. 310/12 |
| 4,454,426 | * | 6/1984 | Benson ................................... 310/15 |
| 4,560,894 | | 12/1985 | Stoll ................................... 310/67 R |
| 4,616,153 | | 10/1986 | Lee ....................................... 318/687 |
| 4,644,205 | * | 2/1987 | Sudo et al. .......................... 310/90.5 |
| 4,965,864 | * | 10/1990 | Roth et al. ............................. 310/12 |
| 5,038,061 | * | 8/1991 | Olsen ..................................... 310/15 |
| 5,166,563 | | 11/1992 | Bassine ................................. 310/15 |
| 5,175,457 | * | 12/1992 | Vincent ................................. 310/15 |
| 5,317,221 | * | 5/1994 | Kubo et al. ............................ 310/12 |
| 5,440,183 | * | 8/1995 | Denne ................................... 310/12 |
| 5,495,131 | * | 2/1996 | Goldie et al. ......................... 310/12 |
| 5,535,853 | | 7/1996 | Skalski ................................. 310/14 |
| 5,777,403 | * | 7/1998 | Yuan ..................................... 310/12 |

FOREIGN PATENT DOCUMENTS

| 01133553 | 5/1989 | (JP) . |
| 9301646 | 1/1993 | (WO) . |

* cited by examiner

*Primary Examiner*—Burton Mullins
(74) *Attorney, Agent, or Firm*—Morrison Law Firm

(57) ABSTRACT

Sealed telescoping tubes are electromagnetically and fluidly actuated to provide linear motion and withstand loading. One of the tubes may be connected to a pressure or vacuum source, and the other sealed to a fixture to provide variable volume load augmentation in addition to electromagnetic actuation. Alternatively, both tubes may be sealed to provide a pneumatic or hydraulic spring with electromagnetic actuation, and the sealed tubes may also be connected to a pressure or vacuum source for load augmentation. A bearing may be used in conjunction with the seal between the tubes to provide resistance to traversal loads. The electromagnetic actuation includes a helical arrangement of coils or permanent magnets to provide linear motion or resistance. The coils can be arranged to be connected to a conventional multi-phase motor drive.

18 Claims, 4 Drawing Sheets

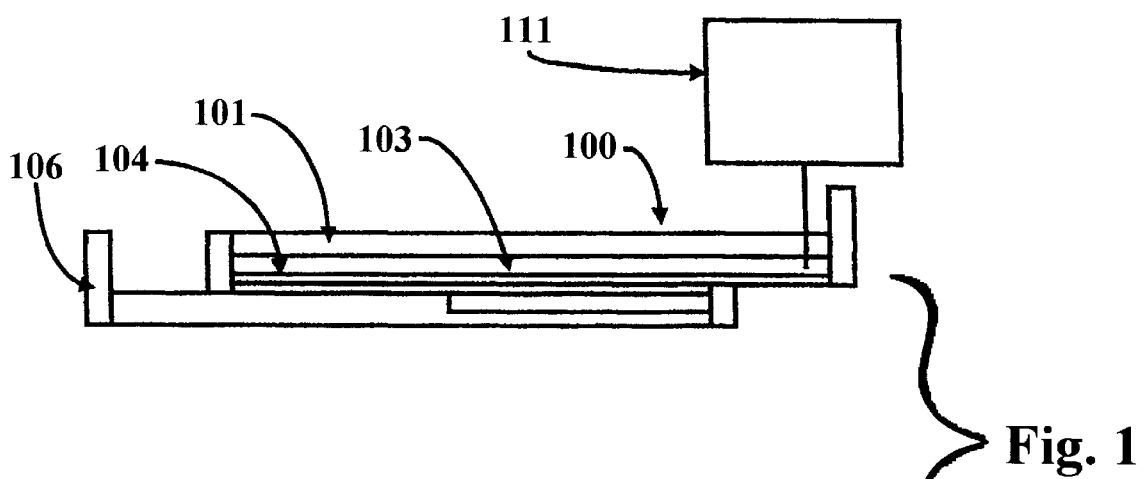
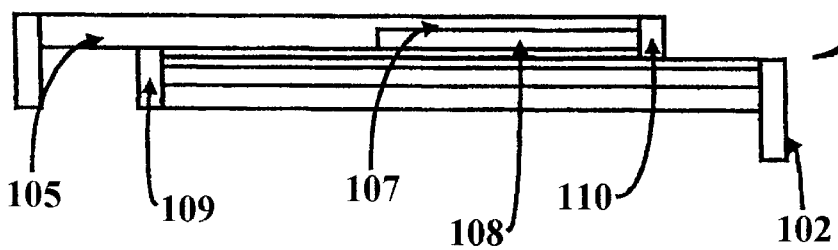
Fig. 1

APPARATUS FOR PRODUCING LINEAR MOTION

This application is a continuation of PCT/GB98/00495 filed Feb. 20, 1998, published as WO 98/37615 on Aug. 27, 1998.

BACKGROUND OF THE INVENTION

The present invention relates to electromagnetic apparatus for producing linear motion. One means of producing linear motion directly by electromagnetic means is the linear electric motor devised by Professor Laithwaite of Imperial College, London. This device can be considered as a conventional rotary electric motor in which the stator and armature have been split axially and unrolled. Although the device is very effective, it does have the disadvantage that considerable unbalanced attractive forces exist between the stator and moving armature, so that some means such as a track or wheeled carriage has to be used to maintain a separation between the stator and the armature.

A second form of linear motor has a cylindrical topology like a conventional electric motor but with the magnetic field-producing elements disposed transversely around the longitudinal axis so that the magnetic fields alternate in polarity along the axis of the motor.

Examples of such linear motors are shown in OLS 2,229, 711; EP 0 221 228; U.S. Pat. No. 4,714,300; EP 0 280 743; EP 0 314 493 and WO 93/01646.

OLS 2,229,711 discloses a DC motor in the form of a piston with a single coil which moves in a cylinder under the action of magnetic fields which are generated by the successively energizing and de-energizing ring-shaped coils spaced axially along the inner surface of the cylinder surrounding the piston.

EP 0 221 228 discloses an arrangement in which both linear and rotary motion of a shaft are produced, the linear motion of the shaft being produced by circumferential coils and the rotary motion by axial peripheral coils.

U.S. Pat. No. 4,714,300 discloses a pressure modulator for use in anti-skid brake systems in which a plunger is made to oscillate longitudinally in a chamber under the influence of a longitudinally-varying magnetic field pattern generated between a winding on the inside of an outer portion of the chamber and a number of magnets disposed around the periphery of the plunger, or vice versa.

EP 0 280 743 discloses a screw for an injection molding machine which is moved linearly by the interaction between magnets on a shaft forming part of the injection screw and a number of coils surrounding the shaft and to which a three-phase alternating current is applied.

EP 0 314 493 discloses another arrangement in which a shuttle is caused to oscillate in a chamber by the interaction between two magnetic fields, one generated by a winding on the shuttle and the other by a winding forming part of the chamber wall.

WO 93/01646 discloses another arrangement in which a piston is driven longitudinally in a cylinder by means of the interaction between two radial magnetic fields, one generated by a series of circumferential coils forming part of the cylinder wall and the other by a plurality of magnets forming part of the piston, or vice versa. For many purposes, the arrangements disclosed in WO 93/01646 are quite satisfactory. However, if the invention of WO 93/01646 is to be used as a combined fluid/electromagnetic actuator, the need to provide fluid-tight seals both on the piston and where the piston rod emerges through an end wall of the cylinder is a disadvantage, particularly as heavy and off-axis loads will tend to bend the piston rod out of true. Also, the solid construction of the piston and piston rod means that larger sizes of the device will become very heavy.

OBJECTS AND SUMMARY OF THE INVENTION

It is an object of the present invention to overcome the drawbacks of the prior art.

It is another object of the present invention to provide an improved electromagnetic apparatus for producing linear motion which is lighter in construction and which has increased transverse stiffness.

Briefly stated, the present invention provides sealed telescoping tubes that are electromagnetically and fluidly actuated to provide linear motion and withstand loading. One of the tubes may be connected to a pressure or vacuum source, and the other sealed to a fixture to provide variable volume load augmentation in addition to electromagnetic actuation. Alternatively, both tubes may be sealed to provide a pneumatic or hydraulic spring with electromagnetic actuation, and the sealed tubes may also be connected to a pressure or vacuum source for load augmentation. A bearing may be used in conjunction with the seal between the tubes to provide resistance to traversal loads. The electromagnetic actuation includes a helical arrangement of coils or permanent magnets to provide linear motion or resistance. The coils can be arranged to be connected to a conventional multi-phase motor drive.

According to an embodiment of the present invention there is provided an electromagnetic apparatus for producing a linearly-directed force, comprising at least two tubular members adapted to slide telescopically, one within the other, means for producing a first magnetic field, the polarity of which alternates along at least a portion of the axial length of the inner tubular member, means for producing a second magnetic field the polarity of which alternates along at least a portion of the axial length of the outer tubular member, and means for varying at least one of the magnetic fields so as to cause the magnetic fields to interact to provide an axial force tending to cause relative motion between the tubular members.

Preferably there is provided at least one seal between the inner surface of the outer tubular member and the outer surface of the inner tubular member so as to prevent the access of harmful environmental components to those parts of the device where relative motion occurs.

The outer ends of the tubular members may include flanges by means of which they can be attached to components of another structure.

The device may be so constructed that the inner tubular member carries an array of permanent magnets and the outer tubular member an assembly of coils which are selectively energized to vary one of the magnetic fields, or vice versa. Other arrangements are possible, for example, both tubular members may carry electrical coils, or the permanent magnets may be replaced by low-reluctance magnetic elements or by a conducting sleeve in which a pattern of eddy currents is induced.

According to a particular aspect of the present invention there is provided an electromagnetic apparatus for producing a linearly-directed force comprising two cup-shaped members, one fitted within the other and adapted to allow relative motion therebetween, means for producing a first magnetic field, the polarity of which alternates along at least a part of the axial length of one of the cup-shaped members, means for producing a second magnetic field the polarity of which alternates along at least a part of the axial length of the other cup-shaped member, and means for varying at least one of the magnetic fields so as to cause the magnetic fields to interact to provide an axial force tending to cause relative motion between the cup-shaped members.

Preferably, there are seals interposed between the cup-shaped members so that they form an enclosed space and one of the cup-shaped members has an opening therein so as to enable fluid to pass into and out of the enclosed space.

The device may be constructed as a moving-coil or moving-magnet device as desired, but in a preferred arrangement the outer cup-shaped member has an electromagnetic element consisting of a plurality of annular coils separated by ferromagnetic spacers which are arranged to present a constant reluctance to a radially-directed magnetic field originating from a magnetic field-generating element associated with the inner cup-shaped element. Preferably the magnetic field generating element associated with the inner cup-shaped element is a plurality of permanent magnets.

According to another embodiment of the present invention, there is provided an apparatus for producing linearly-directed force, comprising: a plurality of tubular members, at least two of the tubular members are fittable one within another and movable relative to each other in an axial direction, means for producing a first magnetic field alternating in polarity along at least a portion of one of the at least two tubular members, means for producing a second magnetic field alternating in polarity along at least a portion of another of the at least two tubular members, and the first and second magnetic fields interact to urge the at least two tubular members in an axial direction relative to each other.

According to a further embodiment of the present invention, there is provided an apparatus for producing linear motion, comprising: a plurality of cup-shaped members, at least two of the cup-shaped members are fittable one within another and movable relative to each other, means for producing a first magnetic field alternating in polarity along at least a portion of one of the at least two cup-shaped members, means for producing a second magnetic field alternating in polarity along at least a portion of another of the at least two cup-shaped members, and the first and second magnetic fields interact to urge the at least two cup-shaped members in a direction relative to each other.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is a schematic longitudinal section of an electromagnetic apparatus embodying the invention for producing linear motion.

DETAILED DESCRIPTION OF THE PREFERRED EMBODIMENT

Figure 2:
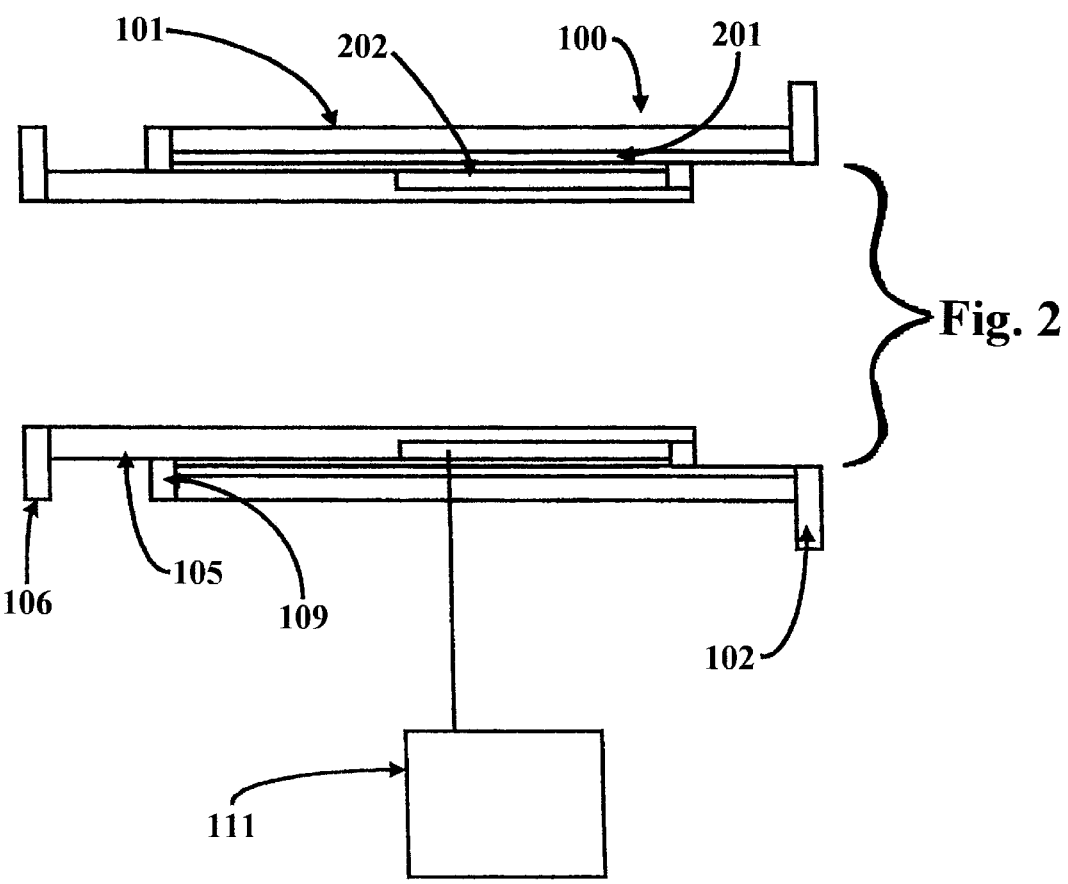
FIG. 2 is a schematic longitudinal section of a second embodiment of the invention.

Referring to FIG. 1 of the drawings, an apparatus 100 for producing linear motion electromagnetically consists of an outer tubular member 101 which has a mounting flange 102 at one end. Inside the outer tubular member 101 is an axial array of coils 103 which are mounted on a polished steel liner 104. An inner tubular member 105 is arranged to be a good sliding fit in the liner 104 of the outer tubular member 101. The inner tubular member 105 also has a mounting flange 106 at its outer end. A portion 107 of the inner tubular member 105 is provided with a series of annular magnets 108 arranged to produce a magnetic field pattern which alternates in the axial direction and interacts with the magnetic field pattern produced by the coils 103. The outside diameter of the annular magnets 108 is approximately the same as that of the remainder of the inner tubular member 105. A seal 109 is provided where the inner tubular member 105 projects from the outer tubular element 101. A bearing and wiper ring 110 is fitted to the end of the inner tubular member 105 which works inside the outer tubular member 101. The bearing and wiper ring 110 acts to constrain any radial deflection of the inner tubular member 105 and to clean the inner surface of the liner 104 of the outer tubular member 101.

Also included, but not shown in the drawing, is a sensor for determining the position in the outer tubular member 101 of the inner tubular member 105. Signals from this sensor are used to control the action of a power supply 111, which is capable of generating electric currents of variable frequency, phase and amplitude, connected to the array of coils 103, so that the electric currents flowing in the coils 103 interact with the magnetic fields produced by the array of magnets 108 on the inner tubular member 105 to produce an axial electromagnetic force of a desired magnitude and direction.

The construction of the device is such that it can withstand considerable transverse loads. Also, the presence of the seal 109 permits the device to be used in hazardous or difficult environments, providing that the open ends of the tubular members 101 and 105 are closed off.

If so desired, the portion of the inner tubular member 105 which projects beyond the outer tubular member 101 when the inner tubular member 105 is at the inner limit of its travel may be of larger or smaller diameter than the remainder. Also, the mounting flanges 102 and 106 may incorporate O-ring seals so that when they are assembled to other structures the volume bounded by the outer faces of the mounting flanges 102 and 106 is sealed. The device may then be adapted to act as a pneumatic spring or actuator as well as providing an electromagnetically generated linear force.

FIG. 2 shows another embodiment of the invention which is identical to that of FIG. 1 except that the liner 104 is replaced by a copper or aluminum tube 201, which may be plated with a hard metal such as chromium so that the tube 201 also acts as the liner 104. Alternatively, a separate liner can be used. Coils 202 in the inner tubular member 105 replace the magnets 108 and generate eddy currents in the copper or aluminum tube 201, which interact with the magnetic field produced by the coils 202. Those components which are common to both embodiments have the same reference numerals.

Figure 3:
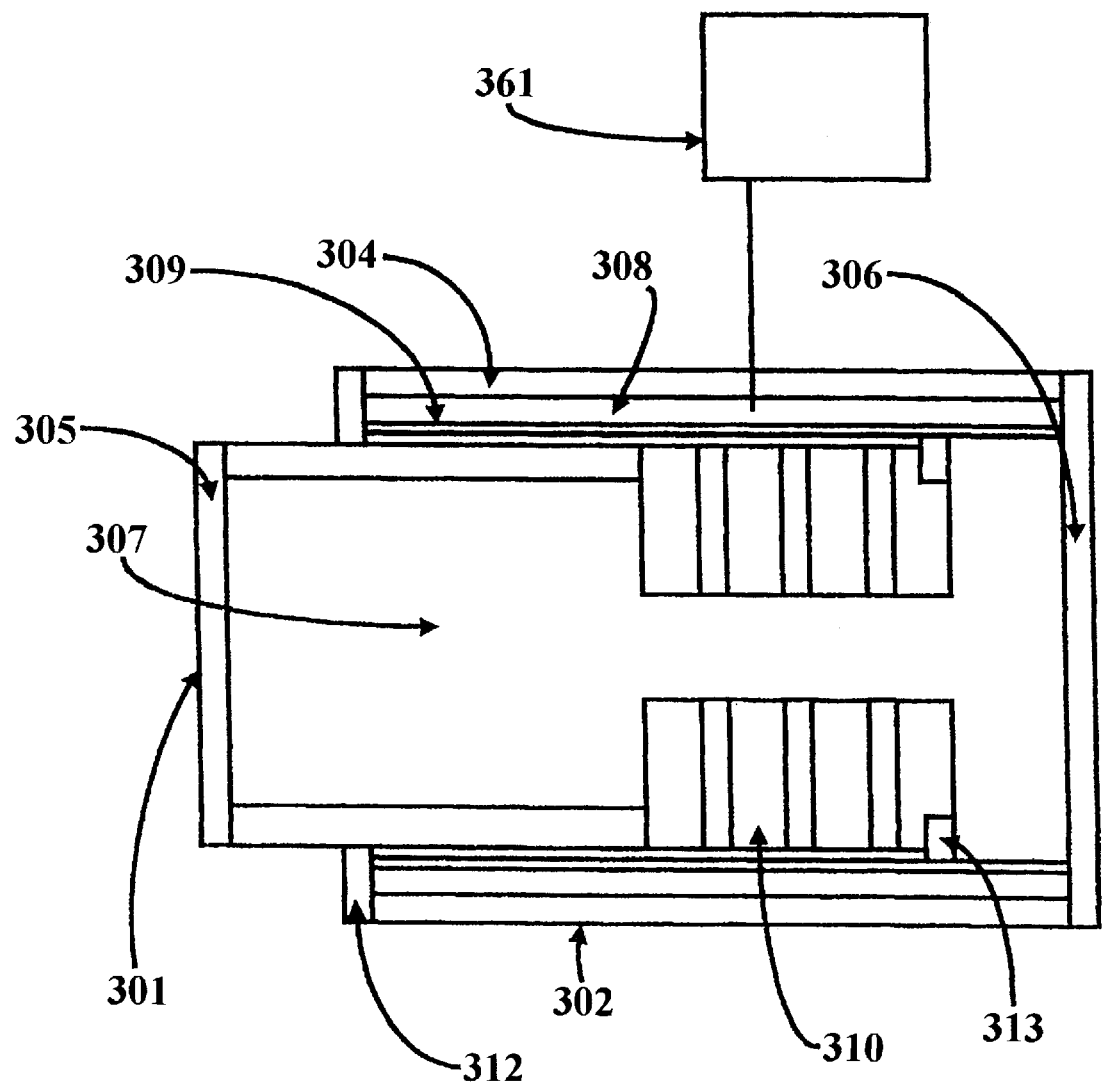
FIG. 3 is a schematic longitudinal section of a third embodiment of the invention.

FIG. 3 shows a third embodiment of the invention in which the two tubular members are closed off.

Referring to FIG. 3, an apparatus for electromagnetically producing a linearly-acting force consists of two hollow cup-shaped members 301, 302 one of which (301) is adapted to move linearly within the other (302). Each of the cup-shaped members 301 and 302 has a tubular section 303,304, respectively, and end closure members 305 and 306 respectively, positioned at the outer ends of the tubular sections 303 and 304 to form an enclosure 307. As before, an axial array of coils 308 is contained between the tubular section 304 of the cup-shaped member 302 and a polished steel liner 309. At the inner end of the cup-shaped member 301 there is an axially-extending annular array of magnets 310 which produces a magnetic field which alternates axially and interacts with the magnetic field produced by the coils 308 when they are energized by a suitable power supply 311. As before, there is included a sensor (not shown) for determining the position of the cup-shaped member 301 within the cup-shaped member 302 and producing signals which are used to control the action of the power supply 311, which again is capable of producing electric currents of variable phase, frequency and amplitude, so that the electric currents flowing in the coils 308 interact with the magnetic field produced by the array of magnets 310 on the cup-shaped member 301 to produce an axial electromagnetic force of a desired magnitude and direction.

The cup-shaped member 302 is sealed to the cup-shaped member 301 by a sliding bearing and seal 312 and the inner end of the cup-shaped member 301 is supported by another sliding bearing 313. In this form of the invention there is no need to provide another seal at the inner end of the cup-shaped member 301 because of the end-closures 305 and 306. As before, considerable lateral stiffness is imparted by the design of the device.

The sealing of the enclosure 307 enables the device to act as a pneumatic spring because movement of one cup-shaped member 301, 302 relative to the other causes a change in the volume of the enclosure 307, and hence the pressure of a compressible medium in the enclosure 307. If one or other of the cup-shaped members has a suitable port in it, the device can be connected to an external reservoir and so be enabled to function as a pneumatic or hydraulic ram as well as an electromagnetic linear force producer. If the device is used as an actuator, then such an arrangement would enable a static or slowly-varying load to be accommodated without drawing an electric current from the power supply 311.

Figure 4:
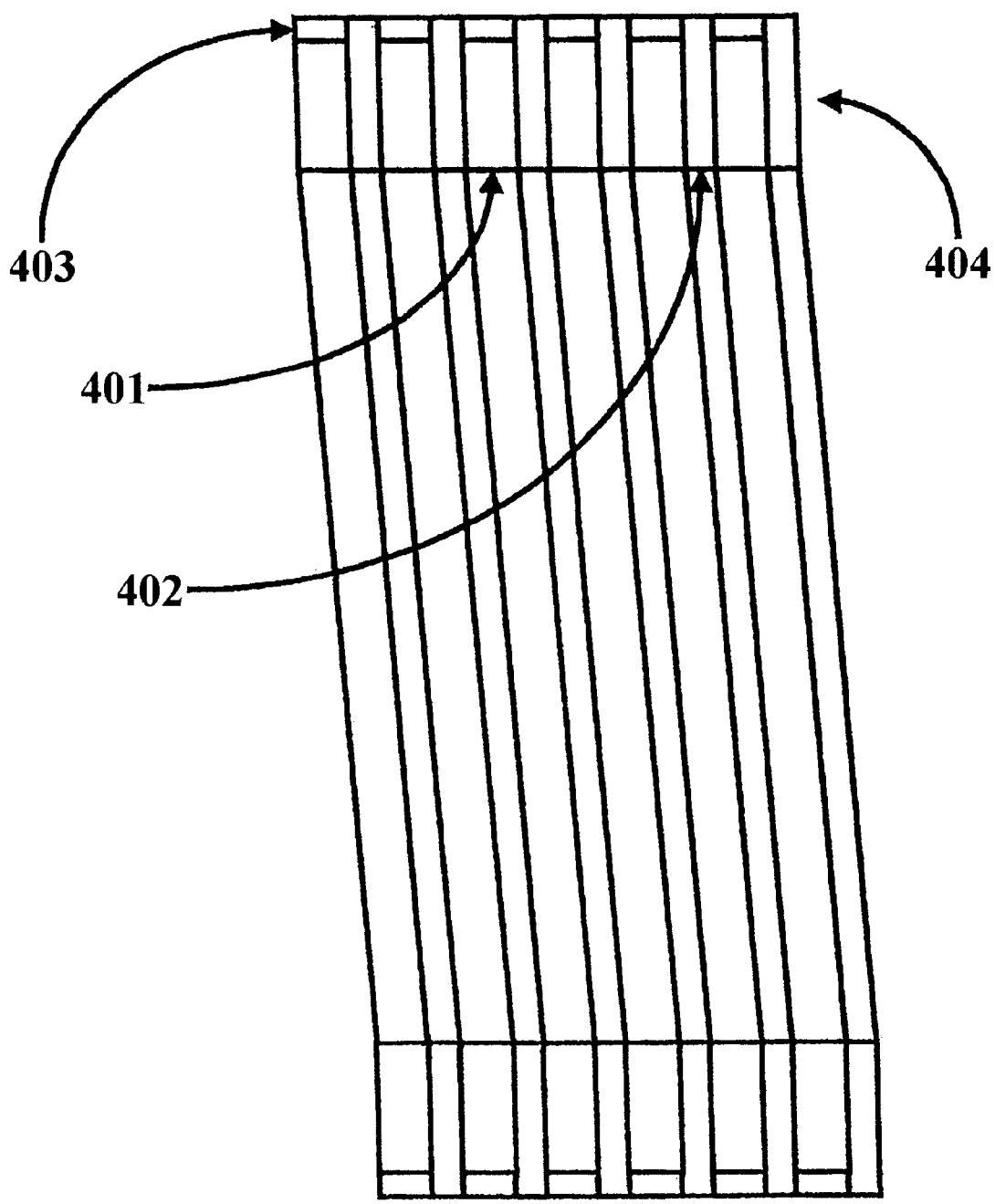
FIG. 4 is a schematic longitudinal section of a means for producing a variable magnetic field for use in carrying out the present invention.

FIG. 4 shows an arrangement of coils for use with any of the forms of the invention described above. Referring to FIG. 4, the array of magnetic field-producing coils associated with the outer members 102,302 previously described, is made up from a stack of circular coils 401 which are interposed between rings 402 made of a ferromagnetic material and external ferromagnetic spacer rings 403. The dimensions of the coils 401, rings 402 and spacers 403, are such that the assembly forms a single cylindrical coil assembly 404. In order that the assembly 404 presents a constant reluctance to a radially-directed magnetic field produced by the member moving within the coil assembly 404, each module of the coil assembly 404 is skewed by the axial length of one coil 401. In another arrangement which is not illustrated, the rings 402 are skewed back and forth over one complete rotation so as to balance any off-axis forces generated by the coil assembly 404.

In the form of invention described with reference to FIGS. 1 and 2, more than one telescopic stage can be used and the terms "inner" and "outer" tubular members are to be interpreted accordingly, as referring to any particular stage of the apparatus.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An electromagnetic apparatus for producing a controlled axially directed force comprising:

two relatively moveable tubular members adapted to slide telescopically one within the other;

a plurality of annular coils fixed to at least a portion of an axial length of one of said relatively moveable members;

current generating means for generating circumferential electric currents in said annular coils;

means for producing a plurality of radially directed magnetic fluxes, the polarity of which alternates along at least a portion of the other of said relatively moveable tubular members;

said current generating means includes controlling means for varying at least one of the frequency, the phase, and the amplitude of said electric currents in said annular coils so as to cause said electric currents and said magnetic fluxes to interact to provide a related resultant axial force tending to cause a relative motion between said two relatively moveable tubular members;

each of said two relatively moveable tubular members have an open end, fitted one within the other, and an open distal end, terminating in a flange by means of which said tubular member can be sealably mounted on a respective relatively moveable portion of a structure so that an enclosed volume is defined between said two relatively moveable tubular members and the portions of said structure to which said tubular members are sealably attached.

2. The apparatus according to claim 1, wherein:

an inner of said two relatively moveable tubular members carries an array of permanent magnets adapted to produce said alternating radial magnetic fluxes; and an outer of said two relatively moveable tubular members carries an assembly of annular coils through which electric currents are passed by said controlling means so as to provide said resultant axial force.

3. The apparatus according to claim 1, wherein:

an outer of said two relatively moveable tubular members carries an array of permanent magnets adapted to produce said radial magnetic fluxes; and an inner of said two relatively moveable tubular members carries an assembly of annular coils through which electric currents are passed by said controlling means so as to provide said resultant axial force.

4. The apparatus according to claim 1, wherein said means for producing said plurality of radially orientated magnetic fluxes comprises:

an array of axially magnetized elements positioned with like poles facing and ferro-magnetic pole pieces interposed between said axially magnetized elements.

5. The apparatus according to claim 1, wherein said annular coils are arranged as a multi-phase motor winding.

6. The apparatus according to claim 1, wherein said radially directed magnetic fluxes are generated by an action of said electric currents flowing in said annular coils associated with one of said relatively moveable tubular members and there is included a member associated with the other relatively moveable tubular member, such that eddy currents induced therein by said electric currents flowing in said annular coils interact with the magnetic flux pattern produced by said electric currents in said annular coils so as to produce said axial force.

7. The apparatus according to claim 1, further comprising at least one bearing and fluid tight seal interposed between an inner surface of an outer tubular member of said two relatively moveable tubular members, and an outer surface of an inner tubular member of said two relatively moveable tubular members.

8. The apparatus according to claim 7, wherein a volume enclosed between said outer tubular member and said inner tubular member contains a fluid by means of which an axial force may be generated on portions of a structure forming closed ends of a space defined by said portions and said two relatively moveable tubular members.

9. The apparatus according to claim 1, wherein said enclosed volume is connected to an external fluid reservoir.

10. The apparatus according to claim 1, wherein said current generating means comprises:
   a plurality of modules, each containing an annular coil, an external spacer made of a ferro-magnetic material having the same axial length as said annular coil, and a ring made of a ferro-magnetic material having the same internal diameter as said annular coil and the same external diameter as said external spacer; and
   said ring and said annular coil being so shaped axially as to present a constant reluctance to the radial directed magnetic flux pattern produced by the magnetic field pattern generating means.

11. The apparatus according to claim 1, wherein each of said plurality of modules is skewed, that is displaced back and forth over one complete rotation in an axial distance equal to an axial length of said annular coil.

12. An electromagnetic apparatus for producing a controlled axially-directed force comprising:
   two relatively moveable tubular members, said two relatively moveable tubular members being adapted to slide telescopically one withing the other;
   a plurality of annular coils affixed to at least a portion of the axial length of one said relatively moveable tubular members;
   current generating means for generating circumferential electric currents in said annular coils;
   means for producing a plurality of radial magnetic fluxes, the polarity of which alternates along at least a portion of the other said relatively moveable tubular members;
   said current generating means includes controlling means for varying at least one of the frequency, the phase, and the amplitude of the electric currents in said annular coils whereby to cause said electric currents and said radial magnetic fluxes to interact and provide a related resultant axial force, urging relative motion between said two relatively moveable tubular members;
   one of said two relatively moveable tubular members having an open end fitted into an open end of the other of said two relatively moveable tubular members, each having a closed distal end, so as to define an enclosed volume within said two relatively moveable tubular members; and
   at least one bearing and fluid tight seal interposed between an inner surface of an outer tubular member of said two relatively moveable tubular members, and an outer surface of an inner tubular member of said two relatively moveable tubular members.

13. The apparatus according to claim 12, wherein a sealed volume contained between said outer tubular member and said inner tubular member contains a fluid by means of which an axial force may be generated and applied to the sealed outer ends of said two relatively moveable tubular members.

14. The apparatus according to claim 13, wherein said sealed volume is connected to an external fluid reservoir.

15. An electromagnetic apparatus for producing a controlled axially-directed force comprising:
   two relatively moveable tubular members, said two relatively moveable tubular members being adapted to slide telescopically one withing the other;
   a plurality of annular coils affixed to at least a portion of the axial length of one said relatively moveable tubular members;
   current generating means for generating circumferential electric currents in said annular coils;
   means for producing a plurality of radial magnetic fluxes, the polarity of which alternates along at least a portion of the other said relatively moveable tubular members;
   said current generating means includes controlling means for varying at least one of the frequency, the phase, and the amplitude of the electric currents in said annular coils whereby to cause said electric currents and said radial magnetic fluxes to interact and provide a related resultant axial force, urging relative motion between said two relatively moveable tubular members;
   one of said two relatively moveable tubular members having an open end fitted into an open end of the other of said two relatively moveable tubular members, each having a closed distal end, so as to define an enclosed volume within said two relatively moveable tubular members; and
   wherein said means for producing said plurality of radial magnetic fluxes, the polarity of which alternates along at least a portion of the other relatively moveable tubular member comprises a plurality of axially magnetized elements positioned with like poles facing and ferro-magnetic pole pieces interposed between said axially magnetized elements.

16. An electromagnetic apparatus for producing a controlled axially-directed force comprising:
   two relatively moveable tubular members, said two relatively moveable tubular members being adapted to slide telescopically one withing the other;
   a plurality of annular coils affixed to at least a portion of the axial length of one said relatively moveable tubular members;
   current generating means for generating circumferential electric currents in said annular coils;
   means for producing a plurality of radial magnetic fluxes, the polarity of which alternates along at least a portion of the other said relatively moveable tubular members;
   said current generating means includes controlling means for varying at least one of the frequency, the phase, and the amplitude of the electric currents in said annular coils whereby to cause said electric currents and said radial magnetic fluxes to interact and provide a related resultant axial force, urging relative motion between said two relatively moveable tubular members;
   one of said two relatively moveable tubular members having an open end fitted into an open end of the other of said two relatively moveable tubular members, each having a closed distal end, so as to define an enclosed volume within said two relatively moveable tubular members; and
   wherein said radially directed magnetic fluxes are generated by an action of said electric currents flowing in said annular coils associated with one of said relatively moveable tubular members and there is included a member associated with the other relatively moveable tubular member, such that eddy currents induced therein by said electric currents flowing in said annular coils interact with the magnetic flux pattern produced by said electric currents in said annular coils so as to produce said axial force.

17. An electromagnetic apparatus for producing a controlled axially-directed force comprising:

two relatively moveable tubular members, said two relatively moveable tubular members being adapted to slide telescopically one withing the other;

a plurality of annular coils affixed to at least a portion of the axial length of one said relatively moveable tubular members;

current generating means for generating circumferential electric currents in said annular coils;

means for producing a plurality of radial magnetic fluxes, the polarity of which alternates along at least a portion of the other said relatively moveable tubular members;

said current generating means includes controlling means for varying at least one of the frequency, the phase, and the amplitude of the electric currents in said annular coils whereby to cause said electric currents and said radial magnetic fluxes to interact and provide a related resultant axial force, urging relative motion between said two relatively moveable tubular members;

one of said two relatively moveable tubular members having an open end fitted into an open end of the other of said two relatively moveable tubular members, each having a closed distal end, so as to define an enclosed volume within said two relatively moveable tubular members;

wherein said current generating means comprises a plurality of modules, each containing an annular coil, an external spacer made of a ferro-magnetic material having the same axial length as said annular coil, and a ring made of a ferro-magnetic material having the same internal diameter as said annular coil and the same external diameter as said external spacer; and said ring and said annular coil being so shaped axially as to present a constant reluctance to the radial directed magnetic flux pattern produced by the magnetic field pattern generating means.

18. The apparatus according to claim 17, wherein each of said plurality of modules is skewed or is displaced back and forth over one complete rotation a distance equal to said axial length of said annular coil.

\* \* \* \* \*